(12) United States Patent
Finkelstein (10) Patent No.: US 10,924,425 B2
(45) Date of Patent: Feb. 16, 2021

(54) VIRTUAL ELEMENT MANAGEMENT SYSTEM

(71) Applicant: Cox Communications, Inc., Atlanta, GA (US)

(72) Inventor: Jeff Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 822 days.

(21) Appl. No.: 14/500,546

(22) Filed: Sep. 29, 2014

(65) Prior Publication Data

US 2016/0094402 A1 Mar. 31, 2016

(51) Int. Cl.
*H04L 12/24* (2006.01)
*H04L 12/911* (2013.01)

(52) U.S. Cl.
CPC ............ *H04L 47/78* (2013.01); *H04L 41/022* (2013.01); *H04L 41/0803* (2013.01)

(58) Field of Classification Search
CPC ... H04L 41/0226; H04L 41/20; H04L 41/022; H04L 47/78; H04L 41/0803; H04L 41/0853; H04L 45/70; H04L 43/10; H04L 41/12; H04L 45/26; H04L 41/24; H04L 41/0266; G06F 9/5061; G06F 9/46; G06F 9/541; G06F 9/5072; G06F 9/54; G06F 13/385; H04W 76/10
See application file for complete search history.

(56) References Cited

U.S. PATENT DOCUMENTS

| | | | | |
|---|---|---|---|---|
| 2012/0005264 | A1* | 1/2012 | McWhirter | G06F 9/5061 709/203 |
| 2013/0014263 | A1* | 1/2013 | Porcello | H04L 63/0272 726/25 |
| 2014/0173157 | A1* | 6/2014 | Shaw et al. | G06F 13/40 710/305 |
| 2015/0188772 | A1* | 7/2015 | Gasparakis | H04L 43/08 709/224 |
| 2015/0249574 | A1* | 9/2015 | Zhang | G06F 9/54 709/223 |
| 2015/0256397 | A1* | 9/2015 | Agarwal | H04L 41/12 370/254 |
| 2016/0007389 | A1* | 1/2016 | Shalev | H04W 36/0022 370/338 |

OTHER PUBLICATIONS

OpenFlow, Wikipedia, Mar. 6, 2014, pp. 1-3. (Year: 2014).*
Software-defined networking, Wikipedia, Sep. 7, 2014, pp. 1-12. (Year: 2014).*

* cited by examiner

*Primary Examiner* — Muhammad Raza
(74) *Attorney, Agent, or Firm* — Eversheds Sutherland (US) LLP (57) ABSTRACT

Virtual element management systems, methods and computer readable media are disclosed. A virtual element management system may include an orchestration layer, a control layer, and one or more adapters. The orchestration layer may receive a request formatted in accordance with a device-independent language from customer premises equipment via a first interface and may communicate the request to an appropriate adapter via the control layer. The adapter may translate the request to a device-specific request formatted in accordance with a device-specific language and may communicate the request to a network device via a second interface.

13 Claims, 5 Drawing Sheets

VIRTUAL ELEMENT MANAGEMENT SYSTEM

BACKGROUND

A variety of types of access networks exist for providing users with high speed data services, television services, telephony services, and the like.

One example type of access network is a cable access network. A cable access network may utilize a hybrid fiber-coax infrastructure that supports both upstream and downstream data transmission between a head-end location where incoming signals are received and customer premises equipment. Another example access network is an optical access network such as a passive optical network, an active optical network, or the like. An optical access network may employ a network architecture in which optical fiber provides all or part of the local loop used for last mile communications.

Yet another example access network is a wireless-based access network such as, for example, a satellite-based access network that relays network data between ground stations and transceivers located at a subscriber's premises via geosynchronous satellites; a wireless cellular network that includes a network of distributed cells, with each cell served by an access point (e.g., a base station) that enables portable transceivers (e.g., mobile phones) to communicate with the base station and with each other via the base station; or a Wi-Fi based access network. Still another example access network is a Digital Subscriber Line (DSL) access network in which network access is provided by transmitting digital data over the wires of a local telephone network (e.g., a public switched telephone network (PSTN)).

End-user devices, such as various types of customer premises equipment, may be configured to communicate with hub devices, content servers, and so forth via one or more types of access networks. Typically, in order to communicate with different types of access networks (e.g., a cable network and a Wi-Fi network) an end-user device must include hardware and software to enable communication using the different protocols associated with each type of network.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, a virtual element management system (vEMS) and associated methods and computer-readable media for implementing and managing such a system to provide network-based services to customers.

A variety of types of access networks are known for providing Internet connectivity to customer premises equipment including, for example, cable access networks, DSL networks, wireless networks, optical networks, and so forth. A number of digital data services may be provided via such networks including, for example, digital television services (e.g., cable television (CATV)); high-speed data transfer (e.g., Internet access) over an existing CATV system architecture using, for example, the Data Over Cable Service Interface Specification (DOCSIS) set of standards; Internet Protocol television (IPTV) services; and so forth. Digital television services may further include, for example, video on demand (VOD) services, broadcast television services, switched digital video services, and so forth.

A variety of types of customer premises equipment may be provided to facilitate the receipt of such digital data services including, for example, a cable modem; a DSL modem; a residential gateway that may provide, among other things, modem and routing functionality; a network interface device (e.g., an optical network terminal (ONT) or optical network unit (ONU)); a set-top box (STB); a content streaming device; and so forth.

A virtual element management system (vEMS) in accordance with example embodiments of the disclosure may include an orchestration layer, a control layer, and one or more adapters. The orchestration layer and the control layer may provide control plane functionality that is decoupled from data plane functionality (e.g., network traffic routing and forwarding functionality) of the underlying network architecture. The orchestration layer, the control layer, and the one or more adapters may include any combination of hardware, firmware, or software. An adapter may provide functionality for translating network traffic formatted in accordance with a meta-language to network traffic formatted in accordance with device-specific languages (e.g., command line languages) associated with different types of access networks. As used herein, the term "meta-language" may refer to a representation of data and/or a protocol for communicating data that is independent of a particular device or access network. Further, as used herein, the term "device-specific language" may refer to a representation of data and/or a protocol for communicating data is specific to a particular device or access network.

In an example embodiment of the disclosure, an end-user device (e.g., customer premises equipment such as a set-top box) may submit a request for content (e.g., Internet streaming content, cable television content, etc.), a provisioning request, a configuration request, or the like via one or more network interfaces of the end-user device. The request may be received by the orchestration layer at a northbound interface and forwarded to the control layer via a southbound interface. The request may be formatted in accordance with a meta-language such as, for example, Extensible Markup Language (XML), a data modeling language such as YANG, a Data Over Cable Service Interface Specification (DOCSIS) configuration language, or the like.

Upon receipt of the request from the orchestration layer, the control layer may determine an appropriate platform (e.g., access network) and corresponding adapter to which to route the request. The adapter may receive the request from the control layer and translate the request from the meta-language to a device-specific language capable of being interpreted by a device of the appropriate platform. For example, if the control layer determines that the request has been transmitted through a cable access network, the control layer may transmit the request to a Data Over Cable Service Interface Specification (DOCSIS) adapter which may, in turn, translate the request to a DOCSIS format and communicate the request to a cable modem termination system (CMTS) or a converged cable access platform (CCAP). As another example, if the control layer determines that the request has been transmitted through an optical network (e.g., a passive optical network (PON)), the control layer may transmit the request to a PON adapter which may, in turn, translate the request to an appropriate network management system (NMS) or configuration management system (CMS) language and communicate the request to an optical line terminal (OLT). It should be appreciated that similar techniques may be applied in connection with other types of access networks.

In certain example embodiments, an adapter that receives a provisioning/configuration request or the like via the orchestration and control layers may be, for example, a virtual machine monitor (VMM) that includes any combination of hardware, firmware, or software for executing one or more virtual machines. In certain example embodiments, the VMM may determine an appropriate device proxy for the request and may communicate the request to the device proxy. The device proxy may be virtual machine such as, for example, a virtualized router (vRouter), a virtualized CMTS (vCMTS), or the like. In certain example embodiments, the virtual machine may be communicatively linked to a physical device such as, for example, a router, CMTS, or the like.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 1:
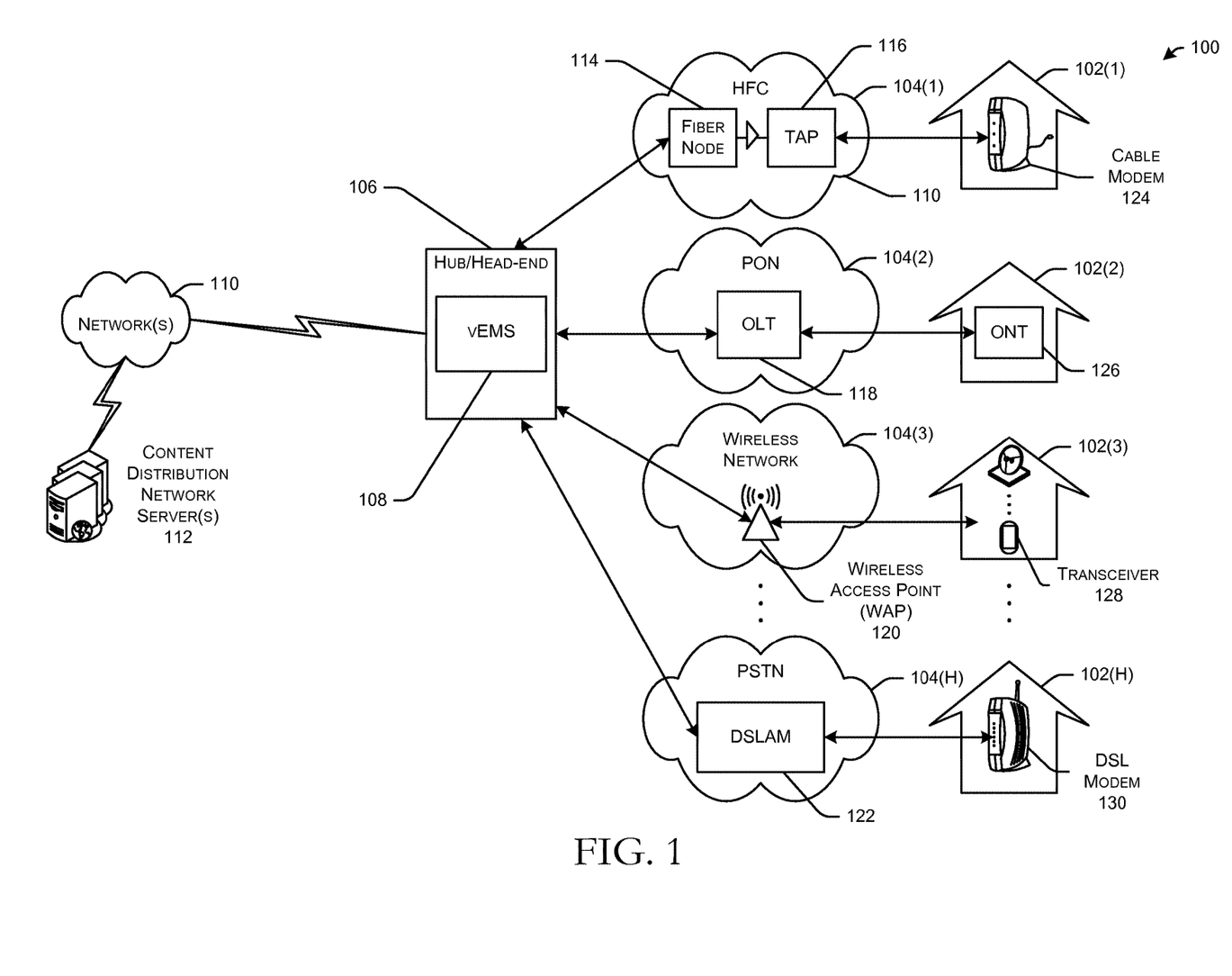
FIG. 1 is a schematic diagram of an illustrative architecture for providing network-based services to customers via one or more networks in accordance with one or more example embodiments of the disclosure.

FIG. 1 is a schematic block diagram of an illustrative architecture 100 for providing network-based services to customers via one or more networks.

A variety of example access networks are depicted in FIG. 1 for connecting customer premises equipment to one or more other networks (e.g., the Internet). An example cable access network may include a hybrid fiber-coax infrastructure 104(1) for carrying downstream and upstream data between a head end or hub 106 and a cable modem 124 located at a customer premises 102(1). The HFC infrastructure 104(1) may include a network of optical fiber nodes (represented generically by fiber node 114) that receive data from the hub 106 via one or more optical fiber links. An optical fiber node 114 may be configured to convert downstream optically modulated signals received from the hub 106 to electrical signals (e.g., radio frequency (RF) modulated signals) for eventual transmission to a customer premises 102(1). The optical fiber node 114 may also include a reverse/return path transmitter for transmitting upstream communications from the customer premises 102(1) to the hub 106.

In a typical HFC infrastructure 104(1), coaxial cable is the physical medium along which data is transmitted between the optical node 114 and the customer premises 102(1). The coaxial portion of the HFC infrastructure 104(1) typically connects between 25 and 2000 homes to a single optical fiber node 114 in a tree-and-branch configuration. One or more amplifiers (e.g., RF amplifiers) may be used at intervals along the transmission path to overcome cable attenuation and passive losses of the electrical signals that can be caused by splitting or "tapping" the coaxial cable. For example, in the coaxial portion of the HFC architecture 104(1), a trunk coaxial cable may be connected to an optical fiber node 114 and may form part of a coaxial backbone to which smaller distribution cables are connected. A trunk amplifier may be provided along the trunk coaxial cable. The smaller distribution cables may be connected to a port of the trunk amplifier and may carry the RF signals down, for example, individual streets. Smaller distribution amplifiers (e.g., line extenders) may be provided downstream from the trunk amplifier for boosting the signal power. A TAP 116 may then be provided for tapping into a distribution line and connecting individual drops to customer premises (e.g., customer premises 102(1)). A single TAP may serve about 4 customer premises.

A variety of other types of access networks are also depicted in FIG. 1. For example, a PON 104(2) is depicted which may include a point-to-multipoint architecture in which optical splitters may be used to enable a single optical fiber to serve multiple customer premises. The PON 104(2) may include an OLT 118 that may be provided at, for example, a service provider's central office. In the context of PON 104(2), the hub 106 may form part of a backhaul of the PON 104(2) that may include one or more intermediate links for carrying traffic between the OLT 118 and a core or backbone network. In certain example embodiments of the disclosure, the OLT 118 may be provided at the hub 106, in which case, the hub 106 may or may not correspond to the service provider's central office.

The PON 104(2) may include an optical distribution network (ODN) that may include optical splitters and fiber optic communication links. An optical splitter may split a fiber optic signal received along a single optical fiber from the OLT 118 into multiple signals that may be transmitted along respective fiber optic links to respective customer premises.

A conversion device may be provided at customer premises 102(2) that terminates the PON 104(2) and provides native service interfaces to the customer. Such a conversion device may be referred to as an optical network unit (ONU) or an optical network terminal (ONT). An example ONT 126 is depicted as being provided at customer premises 102(2) in FIG. 1. In certain example embodiments of the disclosure, the ONT 126 may provide services such as telephony (e.g., plain old telephone service (POTS), voice over IP (VoIP), etc.), data services (e.g., Ethernet data), video, or telemetry. In other example embodiments of the disclosure, the ONT 126 may implement a separate subscriber unit to provide such services. For example, the ONT 126 may present a converged interface such as, for example, a DSL, coaxial cable, or multiservice Ethernet interface to the user, and network termination equipment (NTE) may input the converged interface and output the native service interfaces to the subscriber.

The OLT 118 may serve a variety of functions including, for example, performing conversion between the electrical signals used by the service provider's equipment and the fiber optic signals carried by fiber optic communication links of the PON 104(2), coordinating multiplexing of signals received from ONTs, and so forth. The OLT 118 may employ wavelength division multiplexing (WDM) to transmit signals intended for multiple ONTs at different wavelengths along a single optical fiber. In addition, the OLT 118 may prevent signal collision between multiple signals received from different ONTs by employing a combination of WDM and time division multiplexing (TDM) according to which each ONT transmits its signal at a different wavelength and a different time slot.

The PON 104(2) may employ any of a variety of communication standards including, for example, Ethernet PON (EPON), Gigabit-PON (GPON), Gigabit-Ethernet-PON (GEPON), or the like. The PON 104(2) may employ passive optical splitters that are not supplied with power, and therefore, that distribute an optical signal received on a fiber optic link from the OLT 118 to multiple subscriber links without any electrical current. It should be appreciated, however, that the PON 104(2) may instead be an active optical network (AON) that employs a point-to-point (PTP) network structure in which dedicated fiber optic links are provided between each ONT and an optical concentrator.

A wireless access network 104(3) is depicted in FIG. 1 as well. The wireless access network 104(3) may be a wireless cellular network that includes a network of distributed cells, with each cell served by a wireless access point (WAP) 120 (e.g., a base station) that enables portable transceivers 128 (e.g., mobile phones) to communicate with the WAP 120 and with each other via the WAP 120. The wireless access network 104(3) may employ any of a variety of cellular communication standards including, for example, third generation (3G) communication standards (e.g., the Universal Mobile Telecommunications Systems (UMTS), the CDMA2000 standard, etc.), fourth generation (4G) communication standards (e.g., Worldwide Interoperability for Microwave Access (WiMAX), Long-Term Evolution (LTE), etc.), and so forth.

In other example embodiments of the disclosure, the wireless network 104(3) may be a wireless local area network (LAN) according to which two or more devices may communicate using a wireless distribution method such as spread-spectrum or Orthogonal Frequency Division Multiplexing (OFDM) radio. The wireless LAN 104(3) may include a number of stations, each of which may be equipped with a wireless network interface controller (WNIC). Client stations may communicate with the WAP 120 via RF communication channels, and the WAP 120 may provide the client stations with Internet connectivity via a wired connection to the Internet. For example, referring to FIG. 1, transceiver 128 may be a client station such as a desktop computer, a laptop computer, a mobile device, or the like, and the WAP 120 may be a wireless router. The wireless LAN 104(3) may operate in accordance with any suitable wireless standard such as, for example, any of the Institute of Electrical and Electronics Engineers (IEEE) 802.11 set of standards (Wi-Fi).

In other example embodiments of the disclosure, the wireless access network 104(3) may be a satellite-based access network that relays network data between a ground station gateway device and a transceiver 128 located at a subscriber's premises 102(3) via geosynchronous satellites. The gateway device may relay data to and from a satellite using radio waves and the transceiver 128 may include a radio antenna for relaying data to and from the satellite. A modem may be provided at the customer premises 102(3) for providing an interface between the transceiver 128 and customer premises equipment (e.g., a personal computer (PC), a router, etc.). The modem may be configured to modulate input bit streams received from customer premises equipment and demodulate signals received from the transceiver 128. The modem may include coaxial connectivity to the transceiver 128 and Ethernet connectivity to the customer premises equipment.

Another example access network depicted in FIG. 1 is a PSTN 104(H) via which DSL Internet access may be provided to a customer premises 102(H). DSL service may deliver digital data to customer premises equipment over the same telephone wires of the PSTN 104(H) via which wired telephone service is delivered.

In an example embodiment of the disclosure, a Digital Subscriber Line Access Multiplexer (DSLAM) 122 may be provided at a local telco exchange. The DSLAM 122 may include multiple aggregation cards, each aggregation card having multiple ports where each port communicates with a corresponding DSL modem 130 located at a subscriber's premises 102(H). For upstream transmission, a telephone line (typically twisted-pair copper wire) may simultaneously carry voice and data traffic encoded at different frequencies from the subscriber premises 102(H) to the DSLAM 122, which may be configured to separate the voice and data signals and forward the data signals to the telco's backbone switch for ultimate transmission to the Internet and the voice signals to the telco's PSTN. For downstream transmission (which offers faster transmission rates than upstream traffic in an asymmetric architecture), the DSLAM 122 may be configured to multiplex voice and data signals into a composite signal and transmit the composite signal via a telephone line to the subscriber's premises 102(H), where a splitter may be provided to split the voice and data signals and direct the voice signals to telephone equipment and the data signals to the DSL modem 130. In certain implementations, a residential gateway device may be provided that provides the functionality of a DSL modem, routing functionality, as well as Internet Protocol (IP) telephony functionality.

Each of the example access networks depicted in FIG. 1 is illustratively depicted as having connectivity to the hub 106. More specifically, a field device of each of the example access networks (e.g., an optical fiber node 114 forming part of the HFC network 104(1), an OLT 118 forming part of the PON 104(2), a WAP 120 forming part of the wireless access network 104(3), a DSLAM 122 forming part of the PSTN 104(H), etc.) may be communicatively coupled to one or more devices (not shown) configured to provide functionality at the physical layer, link layer, and/or network layer of the Open Systems Interconnection (OSI) model of network communications.

A virtual element management system (vEMS) 108 in accordance with one or more example embodiments of the disclosure may be provided at the hub 106. Alternatively, at least a portion of the vEMS 108 may be implemented as part of one or more computing devices (e.g., servers) provided in a cloud computing environment that is remote from the hub 106. As previously described, and as will be described in more detail hereinafter, the vEMS 108 may include an orchestration layer and a control layer that provide control plane functionality that is decoupled from data plane functionality (e.g., network traffic routing and forwarding functionality) of the underlying network architecture, as well as, one or more adapters that may provide functionality for translating network traffic formatted in accordance with a meta-language to network traffic formatted in accordance with device-specific languages (e.g., command line languages) associated with different types of access networks and/or devices.

The architecture 100 may further include one or more content distribution network (CDN) servers 112 that may include any suitable combination of hardware, firmware, and software for hosting web content and transmitting the web content to client devices (e.g., the customer premises equipment). The customer premises equipment (e.g., a smart TV, a mobile device, a desktop or laptop device, etc.) may transmit a request for the web content to the CDN server(s) 112 via one or more of the network(s) 110 (e.g., the Internet) and receive the web content therefrom for rendering by, for example, a browser application executing on the customer premises equipment. The web content stored on the CDN server 112 may be generated using any appropriate programming language such as, for example, Hypertext Markup Language (HTML), XHTML, Extensible Markup Language (XML), dynamic programming languages (e.g., Javascript, Perl, etc.), and so forth. The CDN server 112 and the customer services equipment may communicate via any appropriate application protocol including, for example, Hypertext Transfer Protocol (HTTP).

Illustrative System Architecture

Figure 3:
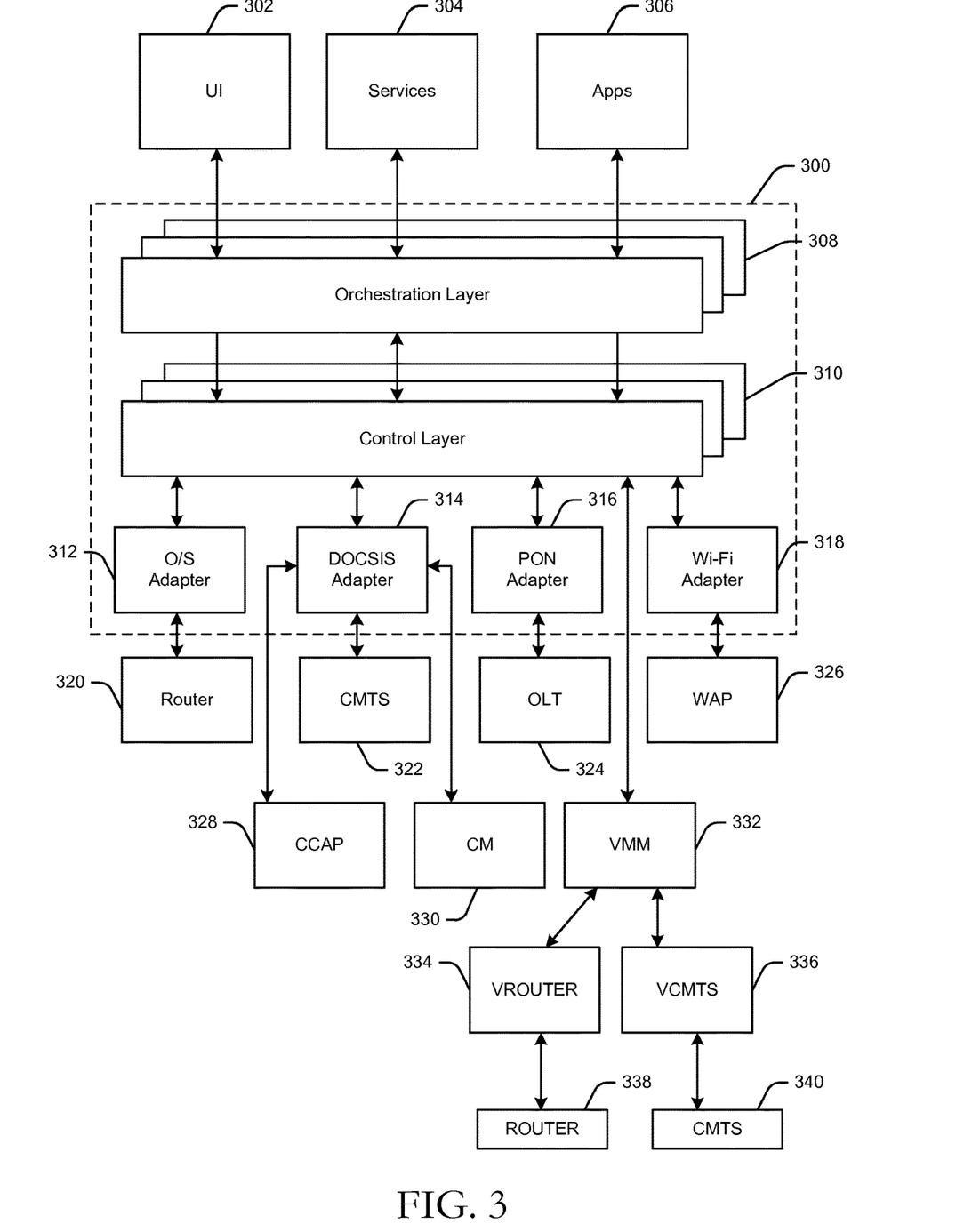
FIG. 3 is a schematic block diagram of a virtual element management system in accordance with one or more example embodiments of the disclosure.

Turning now to FIG. 3, an illustrative system architecture of a virtual element management system (vEMS) in accordance with one or more example embodiments of the disclosure is depicted. The vEMS 300 may include an orchestration layer 308, a control layer 310, and one or more adapters for managing the routing of network traffic between customer premises equipment and network elements (NE).

The vEMS 300 may interact with various customer premises equipment via a northbound interface. For example, the vEMS 300 may manage network data transmissions between various access network termination devices (e.g., a CMTS, a WAP, an OLT, etc.) and customer premises equipment. As depicted in FIG. 3, the vEMS 300 may control the routing of network data for providing one or more user interface(s) 302 such as, for example, an electronic programming guide (EPG), an online web interface, or the like. In addition, the vEMS 300 may control the routing of network data for providing any of a variety of services 304 such as, for example, digital television services, content streaming services, digital broadband Internet services, or the like. Still further, the vEMS 300 may control the routing of network data between applications 306 executing on customer premises equipment and access network termination devices, for example.

In certain example embodiments, the vEMS 300 may receive a request from customer premises equipment. For example, the vEMS 300 may receive a request for content generated in response to user input provided to a user interface 302, to an application executing on customer premises equipment, or the like. As another example, the vEMS 300 may receive a request to enable the provisioning or configuration of services 304 (e.g., a provisioning request, a configuration request, or the like) from customer premises equipment. Although example embodiments of the disclosure may be described herein in connection with requests received by the vEMS 300 from customer premises equipment, it should be appreciated that any suitable network traffic may be exchanged between the vEMS 300 and customer premises equipment.

According to one or more example embodiments, the vEMS 300 may include an orchestration layer 308 that receives a request from customer premises equipment via a particular type of access network (e.g., a HFC cable access network, an optical network, etc.). The request may be for-matted in accordance with a meta-language such as, for example, XML, a data modeling language such as YANG, a DOCSIS configuration language, or the like. YANG is a data modeling language for the NETCONF network configuration protocol. YANG may be used to model configuration data and state data for customer premises equipment and/or other net-work elements.

The northbound interface via which the vEMS 300 receives requests from customer premises equipment may be a RESTful interface. Representational state transfer (REST) is an architectural style that relies on a stateless, client-server, cacheable communications protocol such as, for example, the Hypertext Transfer Protocol (HTTP). Customer premises equipment may utilize a RESTful interface to post, read, and/or delete data. For example, a request for content, a provisioning request, a configuration request, or the like may be transmitted to the vEMS 300 via a RESTful interface. In addition, network data (e.g., content, responses to provisioning requests, configuration files, etc.) may be transmitted from the vEMS 300 to customer premises equipment via the RESTful interface. In certain other example embodiments, the northbound interface between the orchestration layer 308 of the vEMS 300 and customer premises equipment may utilize certain other mechanisms as an alternative to a REST architecture such as, for example, remote produce calls (RPC), a simple object access protocol (SOAP) architecture, a common object request broker architecture (CORBA), or the like.

According to one or more example embodiments, the orchestration layer 308 may communicate a request (e.g., a configuration request) received via a northbound interface of the vEMS 300 to a control layer 310. The control layer 310 may include, for example, a software defined networking (SDN) controller that may be configured to communicate with one or more adapters 312-318. The adapters 312-318 each may be coupled to a respective one or more network devices 320-330 (e.g., network termination devices). Further, the control layer 310 may be configured to communicate with a virtual machine monitor (VMM) 332 which, in turn, manages one or more network device proxies 334, 336. The orchestration layer 308 and/or the control layer 310 may provide control plane functionality (e.g., determinations regarding where network traffic is to be routed) which may be decoupled from data plane functionality (e.g., network data routing and forwarding functionality of the underlying network architecture). Decoupling of the network control and forwarding functions may enable network control functions to become directly programmable without affecting the routing and forwarding functions of the underlying network architecture. The orchestration layer 308 and/or the control layer 310 may utilize any suitable mechanism/protocol/ standard for decoupling the control plane functionality from the data plane functionality. One such standard is OpenFlow, for example.

According to one or more example embodiments, the control layer 310 may include multiple layers including, for example, an application layer at which applications may be running, a control layer at which network services may be provided using Application Programming Interfaces (APIs), and an infrastructure layer at which physical network elements may be coupled to the network layer using one or more protocols or standards such as OpenFlow, for example. In certain example embodiments, the adapters 312-318 may form part of this infrastructure layer of the control layer 310. In such example embodiments, the adapters 312-318 may interface with physical devices using, for example, the OpenFlow standard. In other example embodiments, the adapters 312-318 may be separate from the control layer 310 but configured to communicate with the control layer 310.

OpenFlow may allow the orchestration layer 308 and/or the control layer 310 to remotely administer packet forwarding tables utilized by a network device, by adding, modifying and removing packet matching rules and actions. In this manner, routing decisions can be made periodically or ad hoc by the vEMS 300 and translated into rules and actions with a configurable lifespan, which may then be deployed to a network device's flow table, leaving the actual forwarding of matched packets to the network device at wire speed for the duration of those rules. Packets that are unmatched by the network device may be forwarded to the vEMS 300, or more specifically, to the orchestration layer 308 and/or the control layer 310. The vEMS 300 may then decide to modify existing flow table rules on one or more network devices or to deploy new rules.

Referring further to the functionality provided by the vEMS 300, upon receipt of a request from the orchestration layer 308, the control layer 310 may determine an appropriate platform (e.g., access network) and corresponding adapter to which to route the request. The adapter may receive the request from the control layer and translate the request from a meta-language according to which the request is formatted to a device-specific language capable of being interpreted by a network device of the appropriate platform.

As depicted in FIG. 3, the adapters may include, without limitation, an internetwork operating system (O/S) adapter 312, a DOCSIS adapter 314, a PON adapter 316, or Wi-Fi adapter 318. It should be appreciated that other adapters may be provided for other access network technologies (e.g., a cellular network adapter). Each of the aforementioned adapters may, in turn, be communicatively coupled to a corresponding physical device such that any particular adapter may be configured to translate a request formatted in accordance with a meta-language and received via the control layer 310 to a device-specific language capable of being interpreted by a corresponding network device. The network devices for which corresponding adapters may be provided may include, without limitation, a router 320, a cable modem termination system (CMTS) 322, a converged cable access platform (CCAP) 328, a cable modem (CM) 330, an optical line terminal (OLT) 324, and a wireless access point (WAP) 326.

As an illustrative example, if the control layer 310 determines that the request has been transmitted through a cable access network, the control layer 310 may communicate the request to the DOCSIS adapter 314 which may, in turn, translate the request to a DOCSIS format and communicate the request to the CMTS 322, the CCAP 328, and/or the CM 330. As another example, if the control layer 310 determines that the request has been transmitted through an optical network (e.g., a PON), the control layer 310 may transmit the request to the PON adapter 316 which may, in turn, translate the request to an appropriate network management system (NMS) or configuration management system (CMS) language and communicate the request to the OLT 324. It should be appreciated that similar techniques may be applied in connection with other types of access networks.

In certain example embodiments, a virtual machine monitor (VMM 332) may be provided that includes any combination of hardware, firmware, or software for executing one or more virtual machines. In certain example embodiments, the VMM 332 (e.g., a hypervisor) may determine an appropriate device proxy for the request and may communicate the request to the device proxy. The device proxy may be virtual machine such as, for example, a virtualized router (vRouter 334), a virtualized CMTS (vCMTS 336), or the like. In certain example embodiments, the virtual machine may be communicatively linked to a physical device such as, for example, a router 338, a CMTS 340, or the like. Further, in certain example embodiments, the VMM 332 may be an adapter that forms part of the vEMS 300. In other example embodiments, the VMM 332 may be executing on a host device (e.g., a host server) that is provided separately from one or more computing devices forming part of the vEMS 300. Further, in certain example embodiments, the VMM 332 may receive a request (e.g., a provisioning request) via the control layer 310 and may not translate the request from a meta-language format to a device-specific format. Rather, the VMM 332 may provide the request formatted in the meta-language to a virtual machine (e.g., vRouter 334), and the virtual machine may translate to the request to a device-specific language before communicating the request to a corresponding physical device (e.g., router 338).

The adapters 312-318 may communicate with the control layer 310 using any suitable protocols. For example, the O/S adapter 312 may communicate with the control layer 310 using a Network Configuration Protocol (NETCONF). The NETCONF protocol may use an XML-based data encoding for configuration data as well as protocol messages, and the protocol messages may be exchanged on top of a secure transport protocol, for example.

After receiving a request, via the control layer 310, that is formatted in accordance with a device-independent language (e.g., a meta-language) and converting the request to a device-specific format, an adapter may communicate the device-specific formatted request to a corresponding physical device via one or more corresponding protocols. For example, the PON adapter 316 may use a network management system (NMS) protocol or a configuration management system (CMS) protocol to communicate with the OLT 324. As another example, the DOCSIS adapter 314 may communicate with the CMTS 322 using a DOCSIS configuration protocol. Additionally, or alternatively, the DOCSIS adapter 314 may communicate with the CCAP 328 and/or the CM 330 using a data modeling language such as, for example, YANG. As another example, in one or more example embodiments, the Wi-Fi adapter 318 may utilize a SOAP/HTTP-based protocol to communicate with the WAP 326 such as, for example, a wide area network (WAN) Management Protocol described in the technical specification of Technical Report 069 (TR-069).

Illustrative Device Architecture

Figure 2:
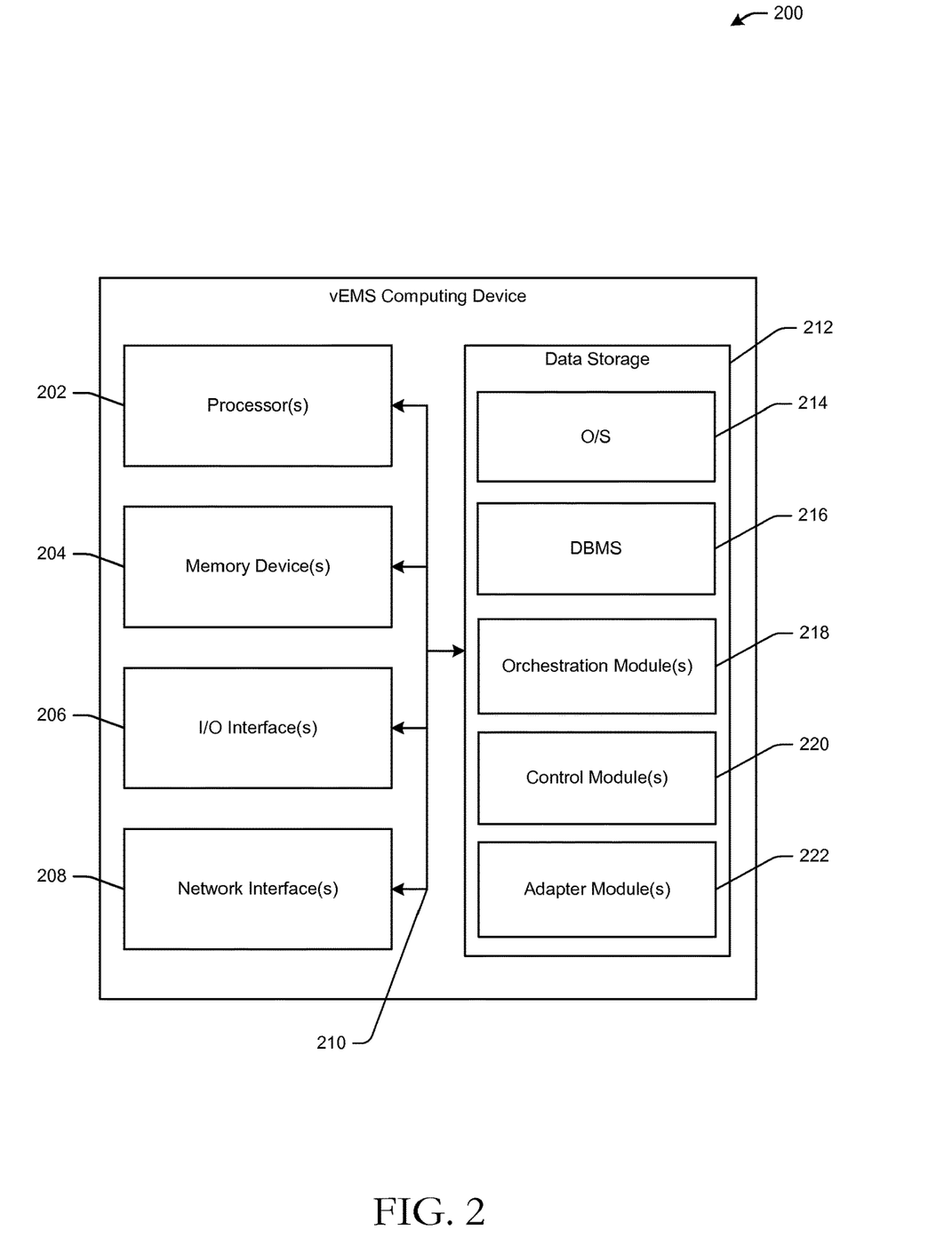
FIG. 2 is a schematic block diagram of an example computing device of a virtual element management system in accordance with one or more example embodiments of the disclosure.

FIG. 2 is a schematic block diagram of an example computing device 200 of a virtual element management system (vEMS) in accordance with one or more example embodiments of the disclosure. In an illustrative configuration, the device 200 may include one or more processors (processor(s)) 202, one or more memory devices 204 (generically referred to herein as memory 204), one or more input/output ("I/O") interface(s) 206, one or more network interfaces 208, and data storage 212. The device 200 may further include one or more buses 210 that may functionally couple various components of the device 200. These various components will be described in more detail hereinafter.

The bus(es) 210 may include at least one of a system bus, a memory bus, an address bus, or a message bus, and may permit exchange of information (e.g., data (including computer-executable code), signaling, etc.) between various components of the device 200. The bus(es) 210 may have any of a variety of bus structures including, without limitation, a memory bus or a memory controller, a peripheral bus, an accelerated graphics port, and so forth. The bus(es) 210 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, a Serial Peripheral Interface architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 212 may include removable storage and/or non-removable storage including, but not limited to, magnetic storage, optical disk storage, and/or tape storage. The data storage 212 may include, for example, memory cards, USB flash drives, external hard disk drives, optical discs, and so forth. The data storage 212 may provide non-volatile storage of computer-executable instructions and other data. The memory 204 and the data storage 212, removable and/or non-removable, are examples of computer-readable storage media (CRSM) as that term is used herein.

The data storage 212 may store computer-executable code, instructions, or the like that may be loadable into the memory 204 and executable by the processor(s) 202 to cause various operations to be performed. In certain example embodiments, computer-executable code stored in the data storage 212 may be executable by the processor(s) 202 directly from the data storage 202. The data storage 212 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 212 for non-volatile storage.

More specifically, the data storage 212 may store one or more operating systems (O/S) 214; one or more database management systems (DBMS) 216; and one or more program modules, applications, or the like such as, for example, one or more orchestration modules 218, one or more control modules 220, and one or more adapter modules 222. Any of the modules depicted in FIG. 2 may include computer-executable code, instructions, or the like that may be loaded into the memory 204 for execution by one or more of the processor(s) 202.

The processor(s) 202 may be configured to access the memory 204 and execute computer-executable instructions loaded therein. For example, the processor(s) 202 may be configured to execute computer-executable instructions of the various program modules of the device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality that may be supported by the various program modules depicted as being stored in the data storage 212, the orchestration module(s) 218 and/or the control module(s) 220 may include computer-executable code, instructions, or the like for providing control plane functionality for making determinations regarding how network traffic between network devices (e.g., between customer premises equipment and an access network termination device) is to be routed. Routing decisions may be based, for example, on any of a variety of factors such as network bandwidth, network congestion, and so forth. Additionally, or alternatively, the orchestration module(s) 218 may include computer-executable code, instructions, or the like for identifying an appropriate network device (e.g., an access network termination device, a content server, etc.) for receiving and processing/responding to a request received from customer premises equipment. The control module(s) 220 may additionally, or alternatively, include computer-executable code, instructions, or the like for identifying an appropriate network device for receipt of a request from customer premises equipment.

The adapter module(s) 222 may include computer-executable code, instructions, or the like for translating a request received via the orchestration module(s) 218 and control module(s) 220 and formatted in accordance with a device-independent meta-language to a request formatted in accordance with a device-specific language capable of being interpreted by the appropriate network device. In certain example embodiments, the orchestration module(s) 218 may form part of the orchestration layer 308. For example, the orchestration module(s) 218 may execute on one or more computing devices providing functionality at the orchestration layer 308. Similarly, the control module( ) 220 may form part of the control layer 310 and the adapter module(s) 222 may form part of one or more corresponding adapters 312-318.

Referring now to other illustrative components depicted in FIG. 2 as being stored in the data storage 212, the O/S 214 may be loaded from the data storage 212 into the memory 204 and may provide an interface between other application software executing on the device 200 and hardware resources of the device 200. More specifically, the O/S 214 may include a set of computer-executable instructions for managing hardware resources of the device 200 and for providing common services to other application programs (e.g., managing memory allocation among various application programs). The O/S 214 may include any operating system now known or which may be developed in the future including, but not limited to, any proprietary or non-proprietary operating system (e.g., a Linux based operating system).

The DBMS 216 may be also be loaded from the data storage 212 into the memory 204 and may support functionality for accessing, retrieving, storing, and/or manipulating data stored in one or more external datastores (not shown) and/or data stored in the data storage 212. The DBMS 216 may use any of a variety of database models (e.g., relational model, object model, etc.) and may support any of a variety of query languages. The datastore(s) may represent data in one or more data schemas and may include any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the device 200, one or more input/output (I/O) interfaces 206 may be provided that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth. The device 200 may further include one or more network interfaces 208 via which the device 200 may communicate with any of a variety of other systems, platforms, networks, devices, and so forth. The input/output interface(s) 206 and/or the network interface(s) 208 may include or otherwise facilitate communication via any of a variety of types of serial or parallel ports including, without limitation, an Ethernet port, a USB port, a High-Definition Multimedia Interface (HDMI) port, a Video Graphics Array (VGA) port, a coaxial RF connector (female), and so forth.

The network interface(s) 208 may facilitate communication between the device 200 and one or more other devices via any suitable type of network. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules, applications, computer-executable instructions, code, or the like depicted in FIG. 2 as being stored in the data storage 212 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Figure 4:
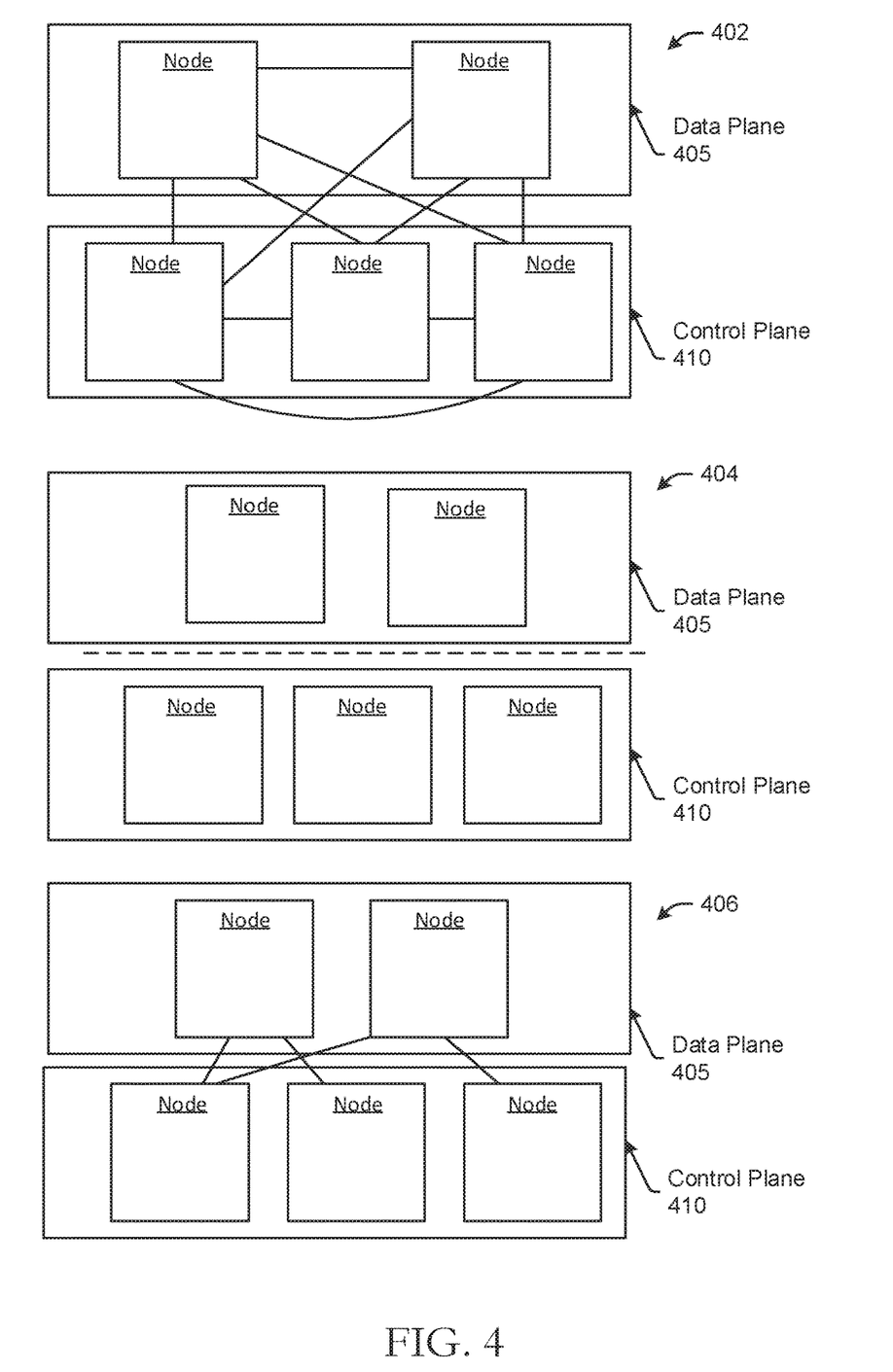
FIG. 4 is a schematic diagram illustrating control and data plane separation in accordance with one or more example embodiments of the disclosure.

FIG. 4 is a schematic diagram illustrating control and data plane separation in accordance with one or more example embodiments of the disclosure. Schematic 402 illustrates a network map for a scenario in which control plane 405 and data plane 410 separation is not present. In such a scenario, each network device may be provided with routing information for each node in the network. For example, each network device may be provided with routing information that indicates a destination address of an optimal next node to which to transmit a data packet for eventual transmission to a final destination address corresponding to a node designated to receive the data packet. More specifically, in such a scenario, each network device may locally store a routing table that provides optimal next-node routing information for each destination address regardless of whether packets designated for transmission to a given destination address are received by that network device.

Schematic 404 illustrates a separation of the control plane 405 and the data plane 410. This may be achieved, for example, by providing a vEMS 300 in accordance with example embodiments of the disclosure, in which the orchestration layer 308, the control layer 310, and/or the adapters 312-318 provide control plane 405 functionality and communicate, via a suitable protocol such as OpenFlow, with physical network devices that provide network traffic routing and forwarding functionality. As previously described, the vEMS 300 may also communicate with virtualized device proxies that may, in turn, communicate with physical network devices. Schematic 406 illustrates a network map corresponding to a scenario in which control plane 405 and data plane 410 separation has been implemented. In such a scenario, each network device is only provided with routing information that is relevant to that network device. For example, when a network device receives packet on an inbound interface, the network device may query the vEMS 300 for a destination address of an optimal next node to which to transmit the received packet for eventual transmission to an intended recipient node.

Illustrative Processes

Figure 5:
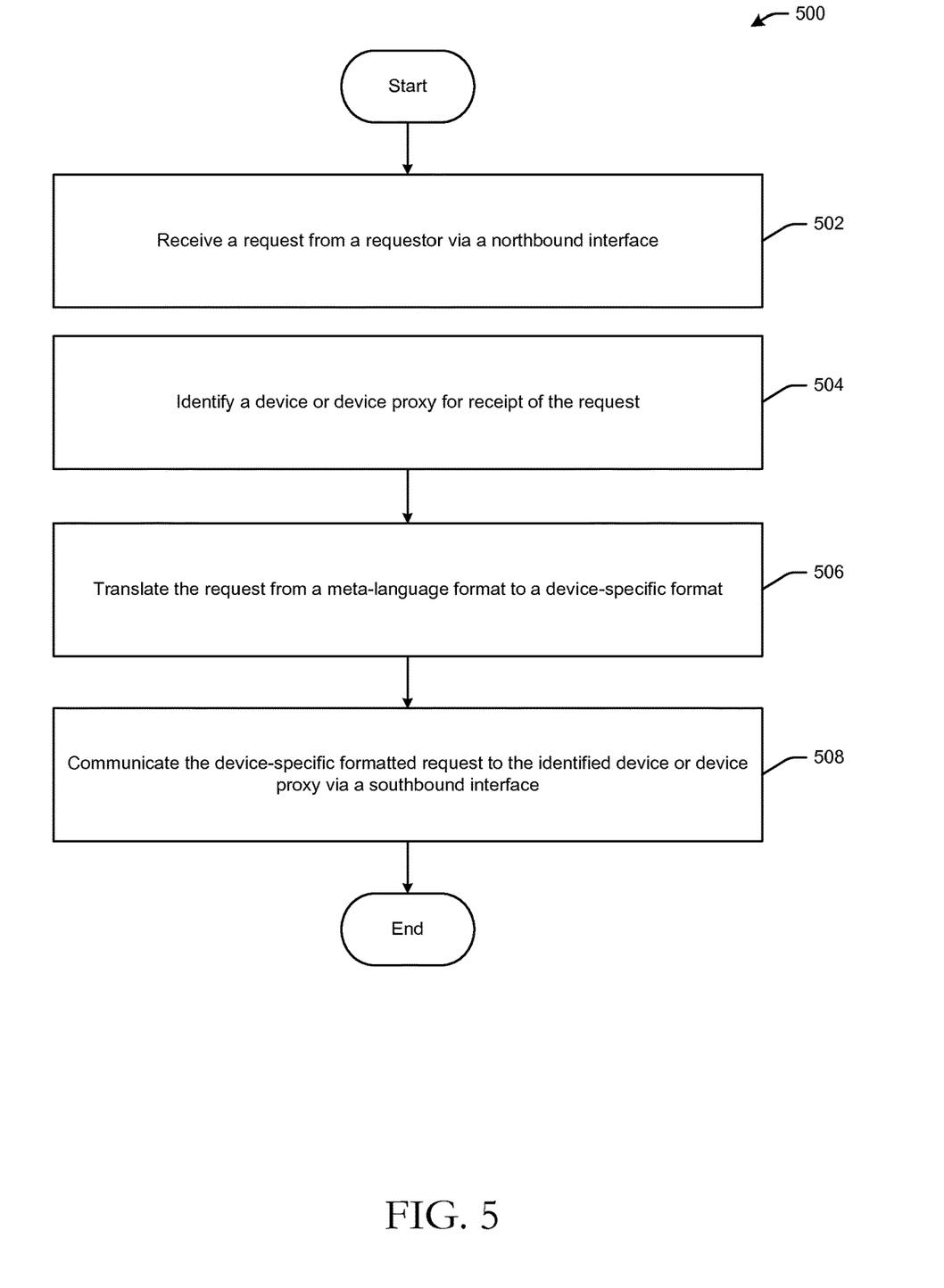
FIG. 5 is a process flow diagram of an illustrative method for receiving a request from customer premises equipment and translating the request to an appropriate device-specific format in accordance with one or more example embodiments of the disclosure.

FIG. 5 is a process flow diagram of an illustrative method 500 for receiving a requestor from customer premises equipment and translating the request to a device-specific format in accordance with one or more embodiments of the disclosure.

At block 502, the vEMS 300 (e.g., the orchestration layer 308) may receive a request (e.g., a request for content, a provisioning request, a configuration request, etc.) from a requestor on a northbound interface which may be a RESTful interface, for example. The customer premises equipment may include, without limitation, a cable modem, a DSL modem, a smart TV, a smart appliance, a content streaming device, a mobile device, a desktop or laptop device, and so forth.

At block 504, the orchestration layer 308 may identify an appropriate device or device proxy for receipt of the request. Alternatively, the orchestration layer 308 may communicate the request to the control layer 310 which may, in turn, identify the device or device proxy to receive the request. Upon identification of a device to receive the request, the control layer 310 may communicate the request to an adapter corresponding to the identified device.

At block 506, the adapter may translate the request to a device-specific format capable of being interpreted by the device designated to receive the request. For example, the request may be formatted in accordance with a meta-language such as XML, YANG, a DOCSIS configuration file, or the like. The adapted may translate the request into a device-specific format or language. At block 508, the adapter may communicate the device-specific formatted request to the identified device via a southbound interface. In those example embodiments in which a device proxy (e.g., vRouter 334) is identified as the intended recipient of the request, the control layer 310 may communicate the request to a VMM (e.g., VMM 332) which may, in turn, communicate the request to the appropriate device proxy. In such example embodiments, the VMM 332 may not perform any translation on the request prior to communicating the request to the device proxy. The device proxy, however, may in certain example embodiments, translate the request to a device-specific format prior to com-municating the request to an associated physical device.

Once the customer device has been configured or provisioned, a customer may be provided with the capability to utilize various network-based services. Such services may include, for example, DVR services, security control features, parental control features, VOD services, virus detection services, and so forth.

One or more operations of method 500 may have been described as being performed by one or more components of the vEMS 300, or more specifically, by one or more program modules executing on such components. It should be appreciated, however, that any of the operations of method 500 described as being performed by a particular component or a particular program module executing thereon may be performed by another component or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of method 500 are described in the context of the illustrative vEMS 300, it should be appreciated that the method may be implemented in connection with numerous other architectural and device level configurations.

In addition, it should be appreciated that the operations described and depicted in FIG. 5 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIG. 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:

receiving, by an orchestration layer module executing on a computing device, a request via a first input network interface of at least one input network interface, wherein the first input network interface is a Representational State Transfer (REST) interface, wherein the first input network interface is associated with a first type of access network, wherein the at least one network interface includes a second input network interface associated with a second type of access network, and wherein the request is formatted in accordance with a device-independent language;

directing, by a computer processor of the computing device, the orchestration layer module to communicate the request to a control layer module executing on the computing device;

determining, by the computer processor and based on the first type of access network associated with the first input network interface, a first network device to receive the request and an adapter for receiving the request, wherein the adapter is configured to facilitate Internet connectivity via the first type of access network;

directing, by the computer processor, the control layer module to communicate the request to the adapter;

executing, by the computer processor, computer-executable code of the adapter to convert the request to a device-specific language capable of being interpreted by the first network device;

directing, by the computer processor, the adapter to communicate, via a first output network interface, the converted device-specific language request to the first network device, wherein the adapter communicates the device-specific request to the first network device using a communications protocol that provides the first output network interface between the adapter and a data plane comprising the first network device, wherein the data plane is decoupled from a control plane comprising the orchestration layer module and the control layer module;

receiving, by the orchestration layer module, a second request formatted in accordance with the device-independent language; and directing, by the computer processor, the control layer module to communicate the second request to a virtual machine monitor (VMM), wherein the VMM communicates the second request to a network device proxy, wherein the network device proxy may convert the second request into a device-specific language.

2. The method of claim 1, wherein the control layer module comprises a software-defined networking (SDN) controller.

3. The method of claim 1, wherein the first network device comprises one of a router, a cable modem termination system (CMTS), converged cable access platform (CCAP), optical line terminal (OLT), a cable modem (CM), and a wireless access point (WAP).

4. The method of claim 1, wherein the adapter comprises one or more of an operating system (O/S) adapter, a data over cable service interface specification DOCSIS) adapter, a cellular passive optical network (PON) adapter, or a Wi-Fi adapter.

5. The method of claim 1, wherein the request is a request for content, a provisioning request, or a configuration request.

6. The method of claim 1, wherein the adapter communicates the request to the first network device in accordance with a device-specific protocol.

7. A system comprising:

a hardware processor; and a hardware memory storing computer-executable instructions, that when executed by the hardware processor, cause the hardware processor to:

receive, by an orchestration layer module executing on a computing device, a request via a first input network interface of at least one input network interface, wherein the first input network interface is a Representational State Transfer (REST) interface, wherein the first input network interface is associated with a first type of access network, wherein the at least one network interface includes a second input network interface associated with a second type of access network, and wherein the request is formatted in accordance with a device-independent language;

direct, by a computer processor of the computing device, the orchestration layer module to communicate the request to a control layer module executing on the computing device;

determine, by the computer processor and based on the first type of access network associated with the first input network interface, a first network device to receive the request and an adapter for receiving the request, wherein the adapter is configured to facilitate Internet connectivity via the first type of access network;

direct, by the computer processor, the control layer module to communicate the request to the adapter;

execute, by the computer processor, computer-executable code of the adapter to convert the request to a device-specific language capable of being interpreted by the first network device;

direct, by the computer processor, the adapter to communicate, via a first output network interface, the converted device-specific language request to the first network device, wherein the adapter communicates the device-specific request to the first network device using a communications protocol that provides the first output network interface between the adapter and a data plane comprising the first network device, wherein the data plane is decoupled from a control plane comprising the orchestration layer module and the control layer module;

receive, by the orchestration layer module, a second request formatted in accordance with the device-independent language; and direct, by the computer processor, the control layer module to communicate the second request to a virtual machine monitor (VMM), wherein the VMM communicates the second request to a network device proxy, wherein the network device proxy may convert the second request into a device-specific language.

8. The system of claim 7, wherein the adapter communicates the converted device-specific language request to the first network device using a communications protocol that provides the first output network interface between the adapter and the data plane comprising the first network device.

9. The system of claim 7, wherein the control layer module comprises a software-defined networking (SDN) controller.

10. The system of claim 7, wherein the first network device comprises one or more of a router, a cable modem termination system (CMTS), converged cable access platform (CCAP), optical line terminal (OLT), a cable modem (CM), and a wireless access point (WAP).

11. The system of claim 7, wherein the adapter comprises one of an operating system (O/S) adapter, a data over cable service interface specification (DOCSIS) adapter, a cellular passive optical network (PON) adapter, or a Wi-Fi adapter.

12. The system of claim 7, wherein the request is a request for content, a provisioning request, or a configuration request.

13. The system of claim 7, wherein the adapter communicates the request to the first network device in accordance with a device-specific protocol.

* * * * *